July 3, 1956 R. C. RUSSELL 2,752,904
SELF-ADJUSTING VALVE ACTUATING MECHANISM
Filed Sept. 16, 1954 2 Sheets-Sheet 1
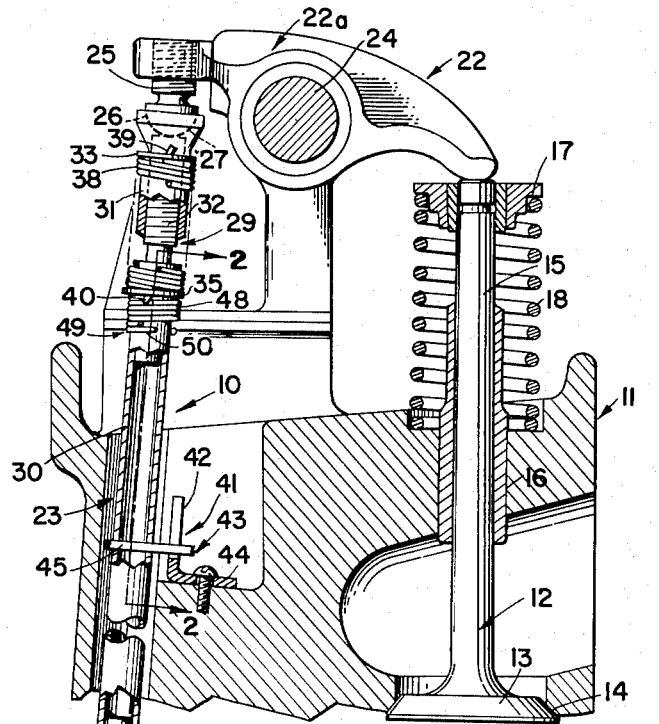
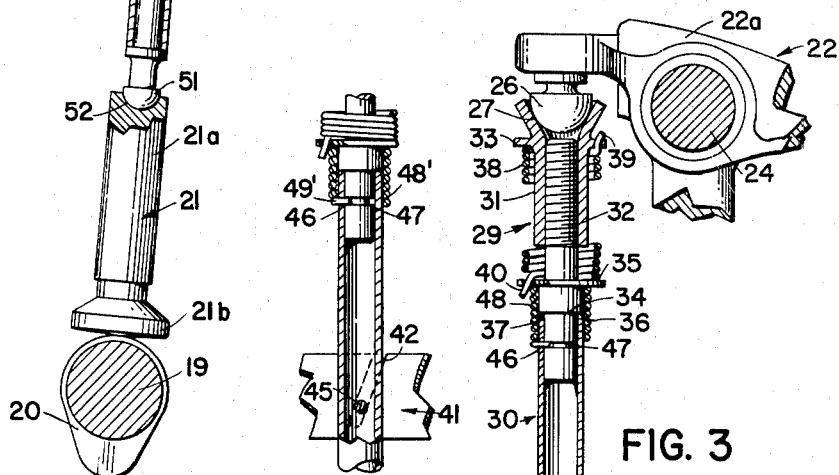
INVENTOR.
ROBERT C. RUSSELL
BY
Attorneys July 3, 1956 R. C. RUSSELL 2,752,904
SELF-ADJUSTING VALVE ACTUATING MECHANISM
Filed Sept. 16, 1954 2 Sheets-Sheet 2

INVENTOR.
ROBERT C. RUSSELL
BY
*McDonald & Teagno*
Attorneys

United States Patent Office 2,752,904
Patented July 3, 1956

2,752,904

SELF-ADJUSTING VALVE ACTUATING MECHANISM

Robert C. Russell, Shaker Heights, Ohio, assignor to Eaton Manufacturing Company, Cleveland, Ohio, a corporation of Ohio Application September 16, 1954, Serial No. 456,564

16 Claims. (Cl. 123—90)

This invention relates to actuating linkages for engine valves and, more particularly, to linkages for this purpose which are of the automatic length adjusting type, such that satisfactory seating of the valves will be assured regardless of the occurrence of expansion, contraction, wear and like variations in the linkages, and constitutes a continuation-in-part of my copending application Serial No. 405,196, filed January 20, 1954.

An object of the invention is to provide novel valve actuating linkage of the automatic length adjusting type which is of a relatively simple and reliable construction employing a minimum number of parts, and in which a rotative adjusting movement is imparted to a length adjusting means by a rotatable push rod member in engagement therewith.

Another object is to provide novel valve actuating linkage of this character in which the rotatable push rod member has a positive movement imparted thereto during the axial reciprocation thereof, by projection means fixed on such rotatable push rod member and engaging an adjacent cam means.

Still another object is to provide valve actuating linkage of the above-indicated type in which a one-way clutch is utilized to positively transmit to a second member of the linkage the rotative movement imparted to a first member thereof.

Additionally, this invention provides novel valve actuating linkage of the kind referred to above in which the length adjusting means comprises torsion spring controlled threadedly connected push rod members one of which has a stem portion telescopingly engaged in the hollow end of an adjacent rotatable push rod member, a third member, axially engageable with one of the push rod members, which is positively oscillated and a coiled wire sleeve frictionally coupling the third member to one of the push rod members for transmitting solely one-way rotation thereto.

A further object of this invention is the provision of valve actuating and length adjusting linkage of the above indicated type that permits of the incorporation thereof in the push rod per se or as a combined part of the rocker arm and push rod of the valve linkage.

The invention can be further briefly summarized as consisting in certain novel combinations and arrangements of parts hereinafter described in detail and particularly set out in the claims hereof.

In the accompanying sheet of drawings, forming a part of this specification:

Fig. 1 is a vertical transverse section taken through engine valve mechanism embodying the novel valve actuating linkage of this invention;

Fig. 2 is a partial side elevation view looking toward the length adjusting means of the linkage, as indicated by the directional line 2—2 of Fig. 1 incorporating a slight modification of structure from that of Fig. 1;

Fig. 3 is a partial reproduction of the structure of Fig. 1 with various other parts thereof in section.

Figure 4:
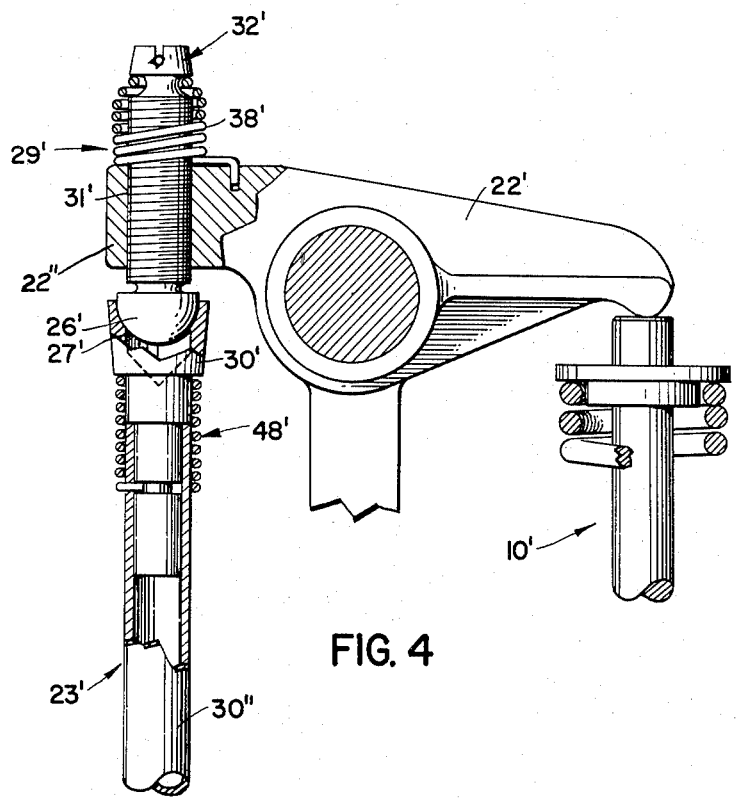
Fig. 4 is a partial vertical transverse section taken through engine valve mechanism embodying a modified form of actuating linkage from that of Fig. 1.

As one highly practical embodiment of this invention, the drawings show valve mechanism 10 as forming a part of an internal combustion engine 11 having a movable valve 12. The valve 12 is of a conventional type having a head 13 engageable with a valve seat 14, and a stem 15 extending through and slidable in a guide bushing 16. A spring seat 17, carried by the outer or upper end of the valve stem 15 is engaged by a surrounding valve spring 18 which sets to normally urge the valve toward its closed position in engagement with the valve seat 14.

The engine 11 is also provided with a conventional rotatable cam shaft 19 having valve actuating main cams 20 thereon. The cams 20 are engageable, respectively, with tappets 21 and impart an upward valve opening movement thereto. The tappets 21 are of a conventional form and each comprise an upper stem portion 21$^a$ slidably mounted in a guideway of the engine and a lower cam follower portion 21$^b$ engaged by the main cam 20.

The valve mechanism 10 also comprises thrust transmitting linkage extending between the valve stem 15 and the tappet 21 and comprising, in general, a rocker means 22 and a push rod means 23. The rocker means 22 is in the form of a rocker lever 22$^a$ supported for rocking movement about the axis of a rockshaft 24, and a threadedly adjustable thrust member 25 carried by one arm of the rocker lever and having a substantially semispherical head 26 rockably engaging in a socket 27 on the upper end of the push rod means 23. The other arm of the rocker lever 22$^a$ engages the upper end of the valve stem 15.

The push rod means 23 comprises a rotative movement responsive length adjusting upper push rod portion or unit 29, and a lower hollow push rod member 30 which is rotatable about the axis of the push rod means. As will be further explained hereinafter, the push rod member 30 applies the rotative adjusting movement to the length adjusting portion 29.

The length adjusting portion 29 is formed by a pair of relatively rotatable right-hand threadedly connected screw members constituting the push rod members 31 and 32. The push rod member 31 is in the form of an internally threaded sleeve or nut member having the socket 27 in the upper end thereof and also having a collar or flange 33 thereon adjacent the socket. The push rod member 32 comprises an externally threaded stem or screw member extending into the threaded sleeve of the push rod member 31. The push rod member 32 also has a stepped diameter stem portion 34 with the smaller diametered section thereof extending in telescoping relation into the upper end of the hollow push rod member 30. The member 32 has a collar or flange 35 thereon at an intermediate point of its length and a downwardly facing annular shoulder or thrust surface 36 formed intermediate the stepped diameter portion 34 and spaced a short axial distance from the lower face of the collar and which surface is engaged by the annular upper end surface 37 of the rotatable push rod member 30. The larger diametered section of portion 34 and the member 30 are of substantially identical outside diameter, the purpose of which will hereinafter appear.

The length adjusting push rod portion 29 also comprises a left-hand wound torsion spring 38 disposed around the push rod members 31 and 32 and provided at its upper and lower ends with hook portions 39 and 40. These hook portions 39 and 40 are engaged, respectively, in openings of the collars 33 and 35 for connecting the ends of the torsion spring in driving relation with the push rod members 31 and 32. The torsion spring 38 is so disposed on the length adjusting portion 29 that it normally tends to cause relative rotation between threadedly connected push rod members 31 and 32 in a direction to lengthen the valve actuating linkage by lengthening the push rod means 23 thereof.

As an important relation existing between certain of the cooperating thrust surfaces of the linkage, it is pointed out that the area of bearing surface contact between the ball portion 26 of the rocker means 22 and the socket 27 at the upper end of the push rod means 23 is substantially greater than the area of bearing surface contact between the annular shoulder 36 of the push rod member 32 and the end surface 37 of the hollow push rod member 30. Because of this relatively larger surface contact area at the upper end of the length adjusting means 29, the amount of friction between the contact surfaces at the upper end will also be relatively greater and will tend to hold the push rod member 31 against rotation while rotative movement is being imparted to the push rod member 32 by the rotatable push rod member 30. The direct engagement of the upper end surface 37 of the rotatable push rod member 30 with the shoulder 36 of the push rod member 32 causes the latter to be rotatably driven by the push rod member 30 in a direction to cause shortening of the length adjusting means 29 when the push rod member 30 is rotated about the axis of the push rod means 23. As a means of positively insuring the transmission of rotation between the push rod members 30 and 32, in addition to the frictional engagement of surface 36 and shoulder 37, providing for shortening of means 29, a self-contracting coiled wire sleeve 48 is provided. Sleeve 48 serves as a one-way rotation transmitting or coupling means between members 30 and 32 and as such is arranged in telescoping relation upon members 30 and 32 in frictional embracing relation to the large diametered section of portion 34 of member 32 and a portion of member 30 adjacent surface 37. The sleeve 48 is wound right handed so that upon clockwise rotation being imparted to member 30, a rotative coupling action by way of sleeve 48 is had between members 30 and 32 whereas for a reverse rotation of member 30, a sleeve 48 is incapable of transmitting rotation therebetween. This is possible due to the fact that for one direction of rotation the sleeve is wound up tighter and in an opposite direction is unwound.

Rotation of the push rod member 30 about the push rod axis is produced by the action of a cam means 41 which comprises cooperating fixed and movable cam elements 42 and 43. The fixed cam element 42 is in the form of an inclined cam slot carried by a bracket 44 which is suitably secured to the engine 11 adjacent the push rod means 23. The movable cam element 43 is carried by the push rod means 23 and is in the form of an arm or pin 45 fixedly secured to member 30 and engaging in and movable along the inclined slot 42.

The rotative movement produced by the cam means 41 is a positive rotary movement which, in accordance with this invention, is applied to the push rod member 30 through pin 45.

The smaller diametered section of stem 34 of the push rod member 32, which extends in telescoping relation into the hollow push rod member 30, is provided with an annular groove 47 located opposite a radial opening 46 in the wall of the push rod member 30. A wire clip 49 includes, a circular body portion 50 embracing member 30 adjacent one end of sleeve 48, and an inturned portion forming a locking element which extends through the opening 46 of the push rod member 30 into the groove 47 of the stem 34. The locking element prevents withdrawal of the stem 34 from the hollow push rod member 30 and thus maintains the telescoping engagement of this stem in the hollow push rod member while at the same time maintaining sleeve 48 in confinement axially therebetween with collar 35.

The lower end of the push rod member 30 is suitably engaged in thrust transmitting relation with the tappet 21, as by having a rounded thrust portion 51 seating in a socket recess 52 of the upper end of the tappet stem 21ᵃ.

In the operation of the valve linkage an upward axial movement imparted to the push rod means 23 by the main actuating cam 20 through the tappet 21, will cause valve opening movement to be transmitted by the linkage to the valve 12. During this upward valve opening movement of the push rod means 23, and during that portion of its downward movement which precedes the engagement of the valve 12 with the seat 14, the linkage will be under valve actuating load such that the friction existing betwen the ball portion 26 and the socket 27 will tend to hold the push rod member 31 against rotation about the push rod axis. During this downward movement of the push rod means 23 preceding the seating of the valve 12, the movable cam element 43 is advanced along the inclined cam slot 42, thereby producing a positive rotative movement and applying the same to the push rod member 30 through pin 45.

This positive rotative movement imparted to the push rod member 30, is transmitted directly to the push rod member 32 through the cooperating shoulders 36 and 37. The direction of inclination of the cam slot 42 is such that the rotation of the push rod members 30 and 32 produced thereby is in a direction to screw the latter member into the internally threaded sleeve of the push rod member 31, thereby shortening the valve actuating linkage and also tensioning the torsion spring 38. The shortening of the linkage introduces thereinto what can be conveniently referred to as "lift loss" and which is very small in amount so as to be insufficient to prevent opening of the valve 12 to the desired extent by the linkage. This shortening of the linkage by introduction of lift loss occurs during each valve closing movement of the linkage.

When the valve 12 has been moved to its closed position in engagement with the valve seat 14 by the spring 18, the valve actuating load is removed from the linkage and thereupon the tendency of the ball portion 26 to frictionally hold the push rod member 31 against rotation is relieved. The torsion spring 38 will then rotate the push rod member 31 in a direction to automatically lengthen the linkage by lengthening the push rod means 23. The lift loss introduced into the linkage as explained above insures a full and positive seating of the valve and, when such seating of the valve has taken place, the lift loss is removed from the linkage by the automatic lengthening resulting from the rotation of the push rod member 31 by the torsion spring 38.

The upward axial movement of the push rod means 23 during the next succeeding valve opening movement of the linkage, returns the movable cam element 43 to the upper portion of the inclined cam slot 42, but by the time the movable cam element has reached this location, the automatic lengthening of the linkage by the action of the torsion spring 38 in rotating the push rod member 31, will have occurred.

In addition to accomplishing an automatic length adjustment of the linkage for insuring proper seating of the valve 12 and compensating for wear and the effects of expansion and contraction, the length adjusting means 29 also prevents or minimizes uneven wear which would otherwise occur as the result of the relative rocking movement between the rocker means 22 and the upper end of the push rod means. This elimination of uneven wear is achieved by an intermittent unidirectional rotative movement being imparted to the length adjusting means 29 as a unit about the push rod axis. This intermittent or step-by-step unidirectional rotative movement results from the conjoint action of the push rod member 30 and the torsion spring 38 on the length adjusting means 29, during which the push rod members 31 and 32 are rotated in succession by the push rod member 30 and the torsion spring, respectively. The conjoint action of the push rod member 30 and the torsion spring 38 thus produces a more or less continuous intermittent unidirectional rotation of the length adjusting means 29 about the push rod axis during the reciprocation of the push rod means 23.

The amount of friction existing between the push rod portions 26 and 27 while the linkage 10 is under load, is greater than the friction between the screw threads of the members 31 and 32, such that the above-explained rotative movement applied to the member 32 will be effective in screwing the latter into the member 31 for shortening the linkage. The friction existing between the flat annular surfaces or shoulders 36 and 37 while the linkage 10 is under load, is usually less than the friction between the push rod portions 26 and 27 but is normally sufficient to cause the rotative shortening movement being supplied by the cam means 42, to be applied to the member 32. To safeguard against any possibility of slippage between surfaces 36 and 37 which would account for failure of adjustment, coil spring sleeve 48 in its function as a one-way clutch or driving means insures of the transmission of rotation being imparted between members 30 and 32 in the desired direction.

When the load on the linkage 10 is relieved and the torsion spring 38 is acting to lengthen the linkage by producing a relative unscrewing action between the members 31 and 32, such unscrewing rotative movement may be applied entirely to the member 31. Usually however, some of the relative unscrewing rotative movement is imparted to both of the members 31 and 32 and this is desirable because it prevents the member 31 from being repeatedly returned to the same position relative to the member 25 during successive valve operating cycles of the linkage. The wear occurring from the relative rocking between the portions 26 and 27 will thereby be prevented from being localized in one spot and will be relatively evenly distributed around the bearing surfaces of these portions.

Fig. 2 discloses a slight modification from the structure disclosed in Figs. 1 and 3 in that instead of utilizing the structure of a separate coil spring sleeve 48 and a clip 49, a single coil spring sleeve 48' having an inturned portion 49' at the extremity of one end coil thereof serving a like purpose as the clip 49 with its inturned portion.

Fig. 4 illustrates a modified application of the structure of Figs. 1 through 3 in that the rocker means 22' of a valve mechanism 10' has a spring tensioned screw 32' threadedly supported in an internally threaded portion 31' of rocker lever 22'' thereof. The threads of the screw and portion 31' of lever 22'' are preferably threaded right hand. A torsion spring 38' of right hand wound structure has its opposite ends suitably attached to the respective rocker lever 22'' and screw 32' tending toward the rotative movement of the lower end of screw 32' away from lever 22''. The screw 32' and rocker lever 22'' serve as the length adjusting mechanism 29' of mechanism 10' comparably to the portion 29 of the push rod means 23 of mechanism 10.

Push rod means 23' of mechanism 10' is at distinct variance with the means 23 of mechanism 10 in that it does not include a length adjusting portion as a part thereof since this portion of the structure is embodied in rocker means 22'. Means 23' includes a push rod member 30' comparable to member 30 of mechanism 10 and a push rod member 30'' comparable in part to member 32 of mechanism 10. Whereas one end of member 30'' has frictional end surface bearing relation with member 30' near one end thereof, its other end provides a socket 27' engageable with a semispherical head 26' formed on one end of screw 32'.

Member 30' is adapted to be positively rotated in an oscillatory manner such as member 30 and serves to impart rotation to member 30'' by way of the end frictional surfaces therebetween and a one-way clutch means 48' in the form of a coiled wire sleeve.

The predetermined friction provided between semispherical head 26' of member 32' and socket 27' of member 30'' is such that for a clockwise rotation of member 30', said member 30'' is rotated clockwise simultaneously therewith by reason of the spring sleeve 48' being of right hand winding and the friction between surfaces of members 30' and 30''. The rotation of member 30'' is then transmitted by way of friction bearing relation of socket 27' and head 26' to screw 32' to thread it into threaded portion 31' of lever 22' thus lineally shortening the valve mechanism 10'. This shortening is possible since the resistance to threading up of screw 32' by reason of spring 38' and the threads themselves is less than the friction between socket 27' and head 26'. On the contrary, no lengthening of the valve mechanism 10' occurs as a result of a counter-clockwise movement of member 30' since under this operation the sleeve 48' rotates freely relative to member 30'' and the friction between the surfaces of members 30' and 30'' is not sufficient to either overcome the friction between socket 27' and head 26' or the friction of threaded portions of screw 32' or rocker lever 22', since at this time the valve spring 18 bears lineally upon the component series engaged members of mechanism 10'. Under these conditions, slippage occurs between the engaged surfaces of members 30' and 30'' or between socket 27' and head 26'.

When the valve is seated, spring 38' is then effective to take up any lift loss previously introduced and occurs as a result of spring 38' rotating screw 32' relative to member 30'' in moving the head 26' of screw 32' axially away from the lever 22'.

From the accompanying drawing and the foregoing detailed description, it will now be readily understood that this invention provides engine valve mechanism embodying novel valve actuating linkage of the automatic length adjusting type in which a positive rotative movement imparted to a rotatable push rod member causes an adjusting rotative movement to be transmitted to one of a pair of threadedly connected linkage members for producing the desired length adjustment of the linkage for insuring proper seating of the engine valve, notwithstanding the occurrence of expansion, contraction or wear in such linkage. It will now also be seen that positive rotative movement is imparted to the rotatable push rod member through a projecting lever arm portion of a sleeve mounted in a fixed relation on such rotatable push rod member. Additionally, it will be seen that by making the fixed sleeve in the form of a self-contracting coiled wire sleeve it can be very economically produced and assembled, and the end portions of the wire sleeve can be utilized, respectively, as the cam-engaged arm projection and a holding means for maintaining a desired telescoping engagement between adjacent push rod members.

Although the novel valve actuating linkage of this invention has been illustrated and described herein to a somewhat detailed extent, it will be understood, of course, that the invention is not to be regarded as being limited correspondingly in scope, but includes all changes and modifications coming within the terms of the claims hereof.

What I claim is:

1. An engine valve linkage comprising threadingly engaged screw and nut members, a spring normally biasing the members apart, means for rotating one of said members in only one direction including a member which is oscillated through a predetermined path, and a one-way clutch mechanism, a part of which is engageable with the oscillated member.

2. An engine valve linkage comprising threadingly engaged screw and nut members, a spring normally biasing the members apart, means engageable with one of said members providing for rotation of said one member in only one direction including a member which is positively oscillated through a predetermined fixed path and contractile spring means engageable with said oscillated member and said one member having a one rotative direction clutching and a reverse rotative direction releasing operation.

3. In engine valve linkage, a pair of threadedly connected push rod members, a spring normally biasing the push rod members apart, a rotatable push rod member, one rotative direction clutching and reverse rotative direction releasing means interconnecting said rotatable push rod member and one of said threadedly connected members, a fixed cam means adjacent said push rod members, and means fixed on said rotatable push rod member and having cam follower engagement with said cam means for causing the rotation of said rotatable push rod member.

4. In engine valve linkage, an axially movable push rod means comprising a pair of threadedly connected push rod members, a spring normally biasing the push rod members apart and a rotatable push rod member having only one rotative direction frictional clutching engagement with one member of said pair and adapted to apply rotative adjusting movement thereto, a fixed inclined cam means adjacent said push rod means, and means fixed on said rotatable push rod member engaging said inclined cam means for causing rotation of said rotatable push rod member during axial movement of the push rod means.

5. In engine valve actuating linkage, a rocker means, an axially reciprocable push rod means comprising a first push rod member rotatable about the axis of said push rod means, and a length adjusting means extending between said rocker means and said first push rod member and comprising a pair of torsion spring controlled threadedly connected other push rod members, a one-way clutch mechanism engageable between said first push rod member and one of said other push rod members, means defining inclined cam surface means adjacent said push rod means, and means mounted in relatively fixed relation on said first push rod member and having projecting means in cam follower engagement with said cam surface means for causing the rotative movement of said first push rod member.

6. In engine valve linkage, an axially movable push rod means comprising a pair of threadedly connected push rod members, a spring normally biasing the push rod members apart and a rotatable push rod member, a self-contractible spring member engageable between said rotatable push rod member and one member of said pair for transmitting rotation in one direction from said rotatable member to said one member, a cam means responsive to axial movement of said push rod means for producing a rotative movement, and means attached to said rotatable push rod member for applying thereto the rotative movement produced by said cam means.

7. A valve linkage according to claim 6 wherein said rotatable push rod member and said one member of said pair thereby have substantially identical coaxial portions and wherein said spring member has portions thereof in frictional engagement with said coaxial portions.

8. In self-adjusting engine valve linkage, an axially reciprocable push rod means comprising a pair of threadedly connected push rod members, a spring normally biasing the push rod members apart and a rotatable push rod member engaging one member of said pair, a one-way clutch spring member engageable between said rotatable push rod and said member engaged thereby for imparting intermittent rotation to said engaged member of said pair of members, a cam means comprising fixed and movable cam elements responsive to axial movement of said push rod means for producing a rotative movement, and means connecting the movable cam element with said rotatable push rod member for applying to the latter the rotative movement produced by said cam means.

9. In engine valve linkage, a rocker means, a screw threaded in one arm of said rocker means, a torsion spring biasing the screw relative to said arm, and an axially reciprocable push rod means comprising a first push rod member oscillatable about the axis of said push rod in a predetermined path, a second push rod member engageably interposed between said screw and first push rod member, and a one-way clutch means interconnecting the first and second push rod members.

10. A valve linkage according to claim 9 wherein the engagement of said screw and second push rod member comprises a ball and socket arrangement.

11. A valve linkage according to claim 9 wherein said first and second push rod members are axially engageable with one another.

12. A valve linkage according to claim 11 wherein said clutch means imparts rotation of the first push rod member to said second push rod member intermittently and in only one rotative direction and wherein said clutch means comprises a self-contractible coil spring.

13. A valve linkage according to claim 9 wherein said second push rod is frictionally engageable at opposite ends thereof respectively with said screw and said first push rod member and wherein the frictional turning force between said frictional engagement of said push rod members is less than between said second push rod member and said screw.

14. A valve linkage according to claim 13 wherein said push rod members adjacent their place of frictional engagement have portions of like outer diameter and wherein said clutch means is in the form of a self-contractible coil spring having portions thereof in telescoping embracing relation on the like diametrical portions of said push rod members.

15. An engine valve linkage comprising threadingly engaged screw and nut members, a spring normally biasing the members apart, means for rotating one of said members in only one direction including a member which is oscillated through a predetermined path, and a one-way coil spring clutch mechanism, a part of which is engageable with the oscillated member.

16. An engine valve linkage comprising threadingly engaged screw and nut members, a spring normally biasing the members apart, a rotatable push rod member having only one rotative direction frictional clutching engagement with one of said threadingly engaged members and adapted to apply rotative adjusting movement thereto, a fixed inclined cam means adjacent said push rod means, and means secured on said rotatable push rod member engaging said inclined cam means for causing rotation of said rotatable push rod member during axial movement of the threadingly engaged members and the push rod member.

References Cited in the file of this patent

UNITED STATES PATENTS

| 1,445,118 | Ware | Feb. 13, 1923 |
| 1,905,888 | Berry | Apr. 25, 1933 |
| 1,930,261 | Berry | Oct. 10, 1933 |
| 2,630,792 | Engemann | Mar. 10, 1953 |
| 2,624,324 | Russell | Jan. 6, 1953 |